(12) United States Patent
Bernabeu-Auban et al.

(10) Patent No.: US 8,375,383 B2
(45) Date of Patent: Feb. 12, 2013

(54) ROLLING UPGRADES IN DISTRIBUTED APPLICATIONS

(75) Inventors: Jose M. Bernabeu-Auban, Sammamish, WA (US); Yousef A. Khalidi, Bellevue, WA (US); Frederick J. Smith, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 12/200,313

(22) Filed: Aug. 28, 2008

(65) Prior Publication Data

US 2010/0058318 A1 Mar. 4, 2010

(51) Int. Cl.
G06F 9/44 (2006.01)
(52) U.S. Cl. .................................. 717/172; 717/168
(58) Field of Classification Search ................... 717/172
See application file for complete search history.

(56) References Cited

U.S. PATENT DOCUMENTS

| | | | |
|---|---|---|---|
| 6,745,382 B1 * | 6/2004 | Zothner | 717/107 |
| 2002/0131405 A1 | 9/2002 | Lin et al. | |
| 2002/0178075 A1 | 11/2002 | Emerick et al. | |
| 2005/0108678 A1 | 5/2005 | Goodwin et al. | |
| 2005/0166197 A1 | 7/2005 | Riley | |
| 2005/0166198 A1 | 7/2005 | Gigliotti et al. | |
| 2005/0289539 A1 | 12/2005 | Krishna | |
| 2006/0009996 A1 | 1/2006 | Lipscomb et al. | |
| 2006/0174238 A1 * | 8/2006 | Henseler et al. | 717/168 |
| 2006/0195816 A1 | 8/2006 | Grandcolas et al. | |

FOREIGN PATENT DOCUMENTS

WO 2004/023236 A3 3/2004

OTHER PUBLICATIONS

Murugesan, et al., "Web Engineering: A New Discipline for Development of Web-based Systems"; 9 pgs.; WebISM Research Group, Dept. of Computing and Information Systems, University of Western Sydney Macarthur, Campbelltown, Australia; http://www-itec.uni-klu.ac.at/~harald/proseminar/web11.

Shantanu Bhattacharya, "Upgrade Web applications with new technologies"; May 22, 2007; 5 pgs.; http://www.ibm.com/developerworks/web/library/wa-apparch/index.html.

Jon Udell, "Don't Upgrade Web Software, Just Keep Improving It"; 3 pgs.; May 31, 2006; http://www.infoworld.com/article/06/05/31/78660_23OPstrategic_1.html.

* cited by examiner

*Primary Examiner* — Don Wong
*Assistant Examiner* — Deric Ortiz
(74) *Attorney, Agent, or Firm* — Shook, Hardy & Bacon L.L.P.

(57) ABSTRACT

Embodiments described herein are directed to updating the various software associated with a distributed application in a piecemeal fashion. All instances of the software are analyzed and separated into different portions, called "roles." Each instance of a role is strategically assigned to an update domain based on the structural information included in the service model of the distributed application. The distributed application is upgraded one update at a time by selecting an update or host update domain, bringing the roles assigned thereto offline, updating the offline roles, bringing the roles back online, and repeating for other update or host update domains.

18 Claims, 5 Drawing Sheets

ROLLING UPGRADES IN DISTRIBUTED APPLICATIONS

BACKGROUND

Modern computers are no longer restricted to the software applications residing on their local disks. The Internet provides access to numerous applications and distributed applications hosted on remote servers or data centers. These remotely accessible distributed applications, commonly referred to as web-scale applications or Internet services, open an entire world of processing resources and unique applications to a user through the World Wide Web (the Web). A plethora of distributed applications currently exist for numerous actions, such as checking the price of the stock quote, retrieving driving directions to and from destinations, or managing profiles on social networks. Thus, the evolution of the software of a service (SaaS) business model is luring complicated software off of the typical computer and onto the Web.

While distributed applications may be easier to deploy because they can be hosted on a remote server, maintenance of distributed applications can be a difficult task. A distributed application typically has to run 24 hours a day, 7 days a week, and be available to a multitude of users. Some distributed applications (such as a program for loading digital photographs into a profile of a social network) may constantly change, and changes need to be propagated throughout all components of the distributed application. Also, because distributed applications are software, new functionality may be introduced and software failures with bugs are inevitable. Therefore, it will be necessary to roll out new versions of distributed application to fix errors (e.g., security vulnerabilities) or improve the functions offered by the distributed application. In both cases, it is often necessary to stop and then restart potentially each and every one of the software components of the distributed application or risk interruption and unavailability of the distributed application.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

One aspect of the invention is directed toward updating software associated with a distributed application in a piecemeal fashion. A service model of the application indicates different software portions of the application to be allocated to different servers. Instances of the roles are allocated to various selected servers. Each instance of a role is strategically assigned to an update domain based on the structural information included in the model of the distributed application. The distributed application is upgraded one update domain at a time by selecting an update domain, bringing the roles assigned thereto offline, updating the offline roles, bringing the roles back online, and repeating for other update domains.

Another aspect of the invention is directed toward maintaining the states of state-specific roles during an upgrade of the distributed application. Once an update domain is selected for upgrading, the roles therein are analyzed to determine whether states should be preserved. If so, the current state information of the state-specific roles are saved before the roles are upgraded, and the upgraded roles are returned to the saved state.

BRIEF DESCRIPTION OF THE SEVERAL VIEWS OF THE DRAWINGS

The present invention is described in detail below with reference to the attached drawing figures, wherein.

DETAILED DESCRIPTION

The subject matter described herein is presented with specificity to meet statutory requirements. The description herein, however, is not intended to limit the scope of this patent. Rather, it is contemplated that the claimed subject matter might also be embodied in other ways, to include different steps or combinations of steps similar to the ones described in this document, in conjunction with other present or future technologies. Moreover, although the term "block" may be used herein to connote different elements of methods employed, the term should not be interpreted as implying any particular order among or between various steps herein disclosed.

As one skilled in the art will appreciate, embodiments of the present invention may be embodied as, among other things: a method, system, GUI, or computer-program product that is embodied on one or more tangible computer-readable media. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media. Computer-readable media include both volatile and nonvolatile media as well as removable and nonremovable media.

By way of example, and not limitation, computer-readable media comprise computer-storage media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read-only memory (ROM), electrically erasable programmable read-only memory (EEPROM), flash memory used independently from or in conjunction with different storage media, such as, for example, compact-disc read-only memory (CD-ROM), digital versatile discs (DVD), holographic media or other optical disc storage, magnetic cassettes, magnetic tape, magnetic disk storage, or other magnetic storage devices. These memory components can store data momentarily, temporarily, or permanently.

Embodiments described herein are directed toward systems for, methods to, and computer-storage media storing instructions for maintaining distributed applications and upgrading distributed applications to newer versions without having to take an entire distributed application offline. Described herein is a platform-based approach for introducing upgrades, patches, and new versions of distributed applications so that the entire distributed application is never taken down completely; instead, strategically selected instances of the distributed application are taken offline, replaced or upgraded, and brought back online.

In one embodiment, a service model (i.e., an abstraction) describing different software portions, called "roles," of the distributed application is provided to an upgrade server configured to create and strategically allocate instances of the different roles to hosting servers. The upgrade server analyzes the service model to determine the interaction of the roles with one another. Instances of the roles are grouped within update domains, which are groupings of roles on one or more servers that can be taken offline at one time. Using these update domains, portions of different instances of the distributed application can sequentially be taken offline for maintenance purposes without affecting the overall availability of the distributed application.

More specifically, one embodiment of the invention is directed toward using the structural information specified within the service model of a distributed application, as described in the distributed applications model, to strategically determine a plan for upgrading the software of a distributed application. In this embodiment, only the instances of roles within one update domain are taken offline at one time. This means that those instances of roles may be revised, upgraded, or deleted with minimal effect to the overall availability of the distributed application. The roles within a second update domain are then taken offline and revised. This process may be repeated until all update domains have been revised, resulting in the entire distributed application (meaning all of its instances of roles) have been upgraded.

Before going further, a number of key definitions should be discussed. First, a "service model" is an abstraction of the distributed application that designates various software components and how these components are structured to comprise the distributed application. The distributed application is a structured, software entity with a structure that is determined by its service model. The service model may include a set of configuration settings, a series of input interfaces, and a series of dependencies on the interface of other services. In order for the distributed application to be a structured entity, it is comprised of a structured set of roles, groups and channels.

Roles provide a template description of a computer program. Roles are described by indicating the computer code implementing the role, the hosting environment required by the role, the configuration settings, the role's set of endpoints, and a model of their performance. The role's configuration settings may include collective settings which are shared by all instances of the role, or individual settings that are particular to each instance of the role. Additionally, the set of endpoints included in the description of a role are further classified as either input endpoints and output endpoints. The output endpoint of a role provides a connection point from a source element to the input endpoint of a target element.

A role instance communicates through its endpoints. A role instance is also defined by the resources included in its description. Roles may also be grouped as a set of roles to form a group, e.g., an "updated domain." The minimal group size consists of a single role. Therefore, groups and roles may be described as an element when the two do not need to be differentiated.

The distributed application also includes channels. Channels establish connections between various elements through the element's end points.

In addition to roles, update domains should also be defined before proceeding further. An update domain comprises a group of role instances that have been strategically assigned to the update domain so that the assigned group of role instances can be taken offline without disturbing the availability of the distributed application. In actuality, roles are simply copies (or instances) of software of the distributed application, and update domains simply include one or more of the role instances. More succinctly put, an update domain is a set of instances of roles and—or portions of software of a distributed application—that can be taken down for upgrade at the same time.

Figure 1:
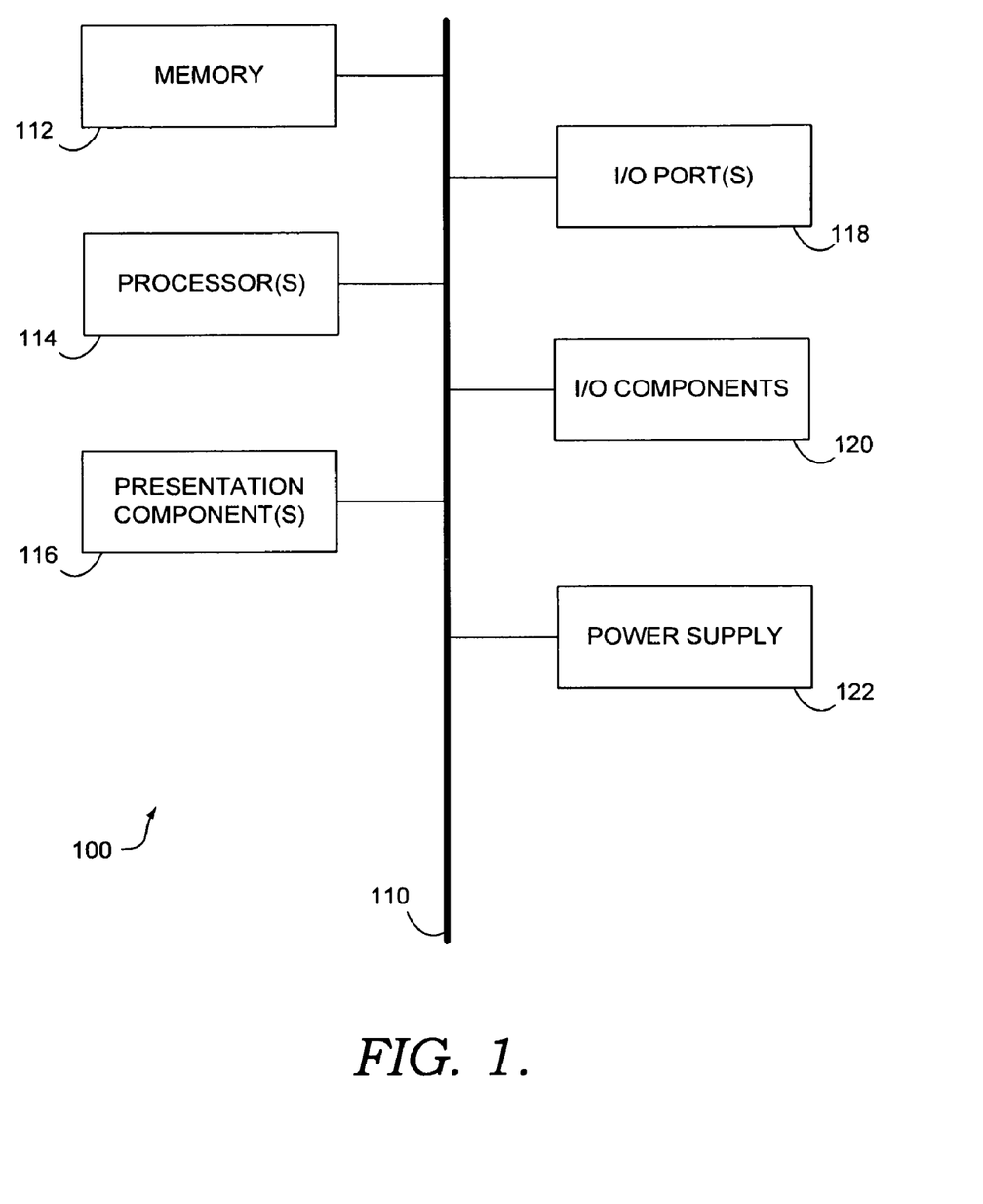
FIG. 1 is a block diagram of an exemplary operating environment for use in implementing an embodiment of the present invention.

Having briefly described a general overview of the embodiments described herein, an exemplary computing device is described below. Referring initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a conventional computer (e.g., a personal computer or laptop).

One embodiment of the invention may be described in the general context of computer code or machine-useable instructions, including computer-executable instructions such as program modules, being executed by a computer or other machine. Generally, program modules including routines, programs, objects, components, data structures, and the like refer to code that perform particular tasks or implement particular abstract data types. Embodiments described herein may be practiced in a variety of system configurations, including handheld devices, consumer electronics, general-purpose computers, more specialty computing devices, etc. Embodiments described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. It will be understood by those skilled in the art that such is the nature of the art, and, as previously mentioned, the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. By way of example, and not limitation, computer-readable media may comprise RAM; ROM; EEPROM; flash memory or other memory technologies; CDROM, DVD or other optical or holographic media; magnetic cassettes, magnetic tape, magnetic disk storage or other magnetic storage devices, or similar tangible media that are configurable to store data and/or instructions relevant to the embodiments described herein.

Memory 112 includes computer-storage media in the form of volatile and/or nonvolatile memory. The memory may be removable, nonremovable, or a combination thereof. Exemplary hardware devices include solid-state memory, hard drives, cache, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

The components described above in relation to computing device 100 may also be included in a mobile device. A mobile device, as described herein, refers to any type of mobile phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. Embodiments described herein mention to both a computing device and a mobile device. In embodiments, computing devices merely refer to devices that are running applications of which images are captured by the camera in a mobile device.

Figure 2:
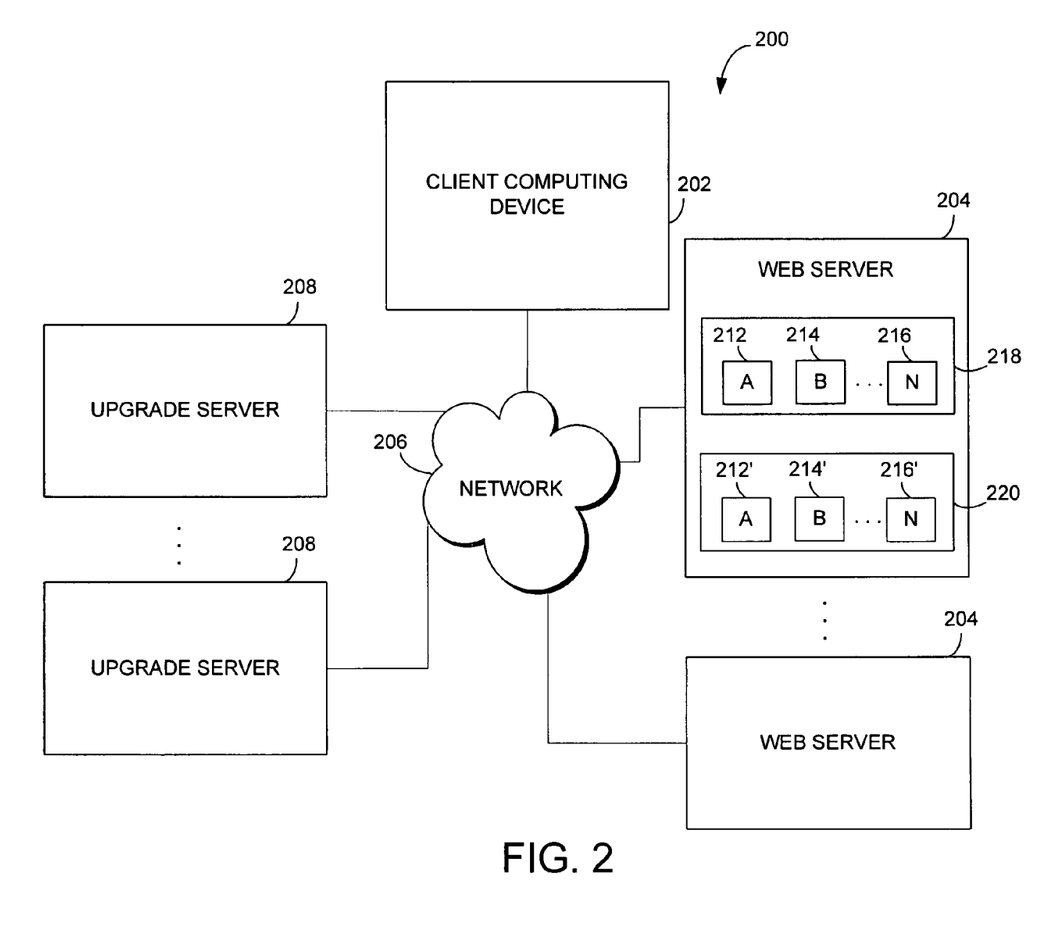
FIG. 2 is a block diagram of a networked system that includes a server configured to assign roles to update domains and assign instances of roles to hosting servers.

FIG. 2 is a block diagram of a networked system 200 for interacting with a distributed application and implementing upgrades of the distributed application, according to an embodiment of the invention. The network environment 200 represents the classic client-server model for implementing distributed applications. As depicted, a client computing device 202 interacts with multiple web servers 204 via a network 206. The client computing device 202 requests and receives data from the web servers 204 using a transfer protocol. Examples of transfer protocols include, for example but without limitation, the hypertext transfer protocol (HTTP), file transfer protocol (FTP), simple object access protocol (SOAP), or the like. Requests and responses may be passed as different markup language messages—e.g., extensible markup language (XML), hypertext markup language (HTML), or the like—or as parameters for scripting languages. One skilled in the art will appreciate that numerous scripting languages may be used by different distributed applications, a list of which, while not exhaustive, includes JAVAScript, personal home page (PHP), VBScript, or the like. Embodiments are not limited to any particular communication protocol, message language, or scripting language, as one skilled in the art will appreciate that different languages and protocols may be used to interact with distributed applications.

The client computing device 202, the web servers 204, and the upgrade server 208 communicate via the network 206. Network 206 may include any computer network or combination thereof. Examples of computer networks configurable to operate as network 203 include, without limitation, a wireless network, landline, cable line, fiber-optic line, local area network (LAN), wireless LAN (WLAN), wide area network (WAN), or the like. Network 206 is not limited, however, to connections coupling separate computer units. Rather, network 206 may also comprise subsystems that transfer data between servers or computing devices. For example, network 206 may also include a point-to-point connection, Ethernet, backplane bus, electrical bus, neural network, or other internal system. These networks are well known and therefore need not be discussed at length herein.

Each of the web servers 204 and the upgrade servers 208 may include any type of application server, database server, or file server configurable to perform the methods described herein. In addition, the server 204 and the upgrade server 208 may each be a dedicated or shared server. Each server may be configured to run server-side or database software, such as, structured query language (SQL) software or the like.

While not illustrated in FIG. 2, some embodiments may use multiple upgrade servers 208 to assign and transmit instances of roles to the web servers 204. While depicted as a single unit, the upgrade server 208 may actually comprise multiple servers. For the sake of clarity, embodiments discussed herein reference a single upgrade server 208 performing certain tasks; however, the various tasks performed by the upgrade server 208 may be performed by multiple upgrade servers 208.

Components of the web servers 204 and the update server 208 may include, without limitation, a processing unit, internal system memory, and a suitable system bus for coupling various system components. These servers may also be or can include a computing device running the Microsoft Windows®, MacOS™, Unix, Linux, Xenix, IBM XIX™, Hewlett-Packard UX, Novell Netware™, Solaris™, OS/2™, BeOS™, Mach, Apache, OpenStep™, or other operating system or platform. In an embodiment, two or more web servers 204 or update servers 208 may be directly or indirectly coupled to each other without using network 206. Furthermore, the web servers 204 and the update server(s) 208 will typically include, or have access to, a variety of the aforementioned computer-readable media.

The client computing device 202 is configured to interact with the distributed application on one or both of the web servers 204. In operation, the upgrade server 208 receives a service model for the distributed application. The service model may be sent by a user from the client computing device 202, e.g., though a website on the World Wide Web. The service model specifies structural information of the distributed application (i.e., roles and/or channels). Based on the structural information, the upgrade server 208 transmits instances of the roles of the distributed application to the web servers 204. Different role instances may be sent to different to different servers. For example, although not depicted in FIG. 2, each of three roles of an application may be stored on separate web servers 204, or two of the roles may be stored on one web server 204.

While FIG. 2 only depicts two web servers 204, a dotted line is illustrated to show that, in fact, a plurality of web servers 204 may be used to store either different roles or copies of different roles of the distributed application. It should be noted that web servers 204 are servers configured to host the distributed application and not limited to solely hosting web-based applications. For clarity sake, roles are only described below on one of the web servers 204; although, one skilled in the art that different roles, or copies of different roles, may be stored on numerous web servers 204. Moreover, the term "web server," when used to refer to web servers 204, is not meant to only refer to servers hosting distributed applications on the World Wide Web. Rather, web servers 204 includes any server capable of hosting an application that can be accessed across a network.

The distributed application comprises numerous roles, represented as role A 212, role B 214, and role N 216. While only three roles are depicted, embodiments are not limited to any number of roles, as different distributed applications may comprise additional or less software components. Roles A 212, B 214, and N 216 represent binary representations of different portions of software. In one embodiment, these roles include a designation of the state a particular roll or group of roles is in at a specific time. To do so, a "sticky bit" may be set, specifying that the role is state-specific and will need to be brought back online at the state the role was previously in before being taken offline.

In one embodiment, roles of the distributed application are copied and stored on the web servers 204 to make sure the distributed application is available to many requesting users. The upgrade server 208, in one embodiment, is configured to assign different roles to different update domains 218 and 220. The designation of update domains 218 and 220 is stored on the upgrade server 208, in one embodiment. Upgrades to the distributed application are made, in one embodiment, by bringing the roles 212, 214 and 216 within the update domain 218 offline, upgrading the appropriate roles, and bringing the roles back online. Afterward, the roles of the next update domain 220 can then be taken offline, upgraded, and brought back online. This sequential updating of the roles in different update domains are repeated until all of the roles of the distributed application have been updated appropriately.

In operation, the upgrade server 208 determines which roles to include in the update domains 218 and 220 by analyzing the service model for the distributed application. Additionally, although not pictured in FIG. 2, roles for hosting the distributed application (i.e., roles of the web server 204) may also be assigned to particular update domains as well. To avoid confusion, roles not specific to the distributed application but specific to hosting the distributed application assigned to "host update domains," which are update domains that specific to either hosting the distributed application or to the web servers 204. Although embodiments are described herein with reference only to update domains, embodiments of the invention also contemplate designating roles for hosting the distributed application to host update domains. For clarity, however, only the allocation of roles from the service model to update domains is described herein.

The developer of the distributed application may submit structural information about the distributed application to the upgrade server 208. This structural information comprises the relationships between the various roles within the distributed application.

To maximize the availability of the distributed application, the states of some roles may be preserved before being taken offline. In one embodiment, a sticky bit may be assigned to the a role, signifying that a portion of the state of that particular role must be stored and preserved. Roles that specify to preserve their state, referred to herein as roles with a "sticky state," will trigger the upgrade server 208 to store their states before taking them offline and signaling the web server 204 which state to bring upgraded versions of the roles back to when brought back online.

Figure 3:
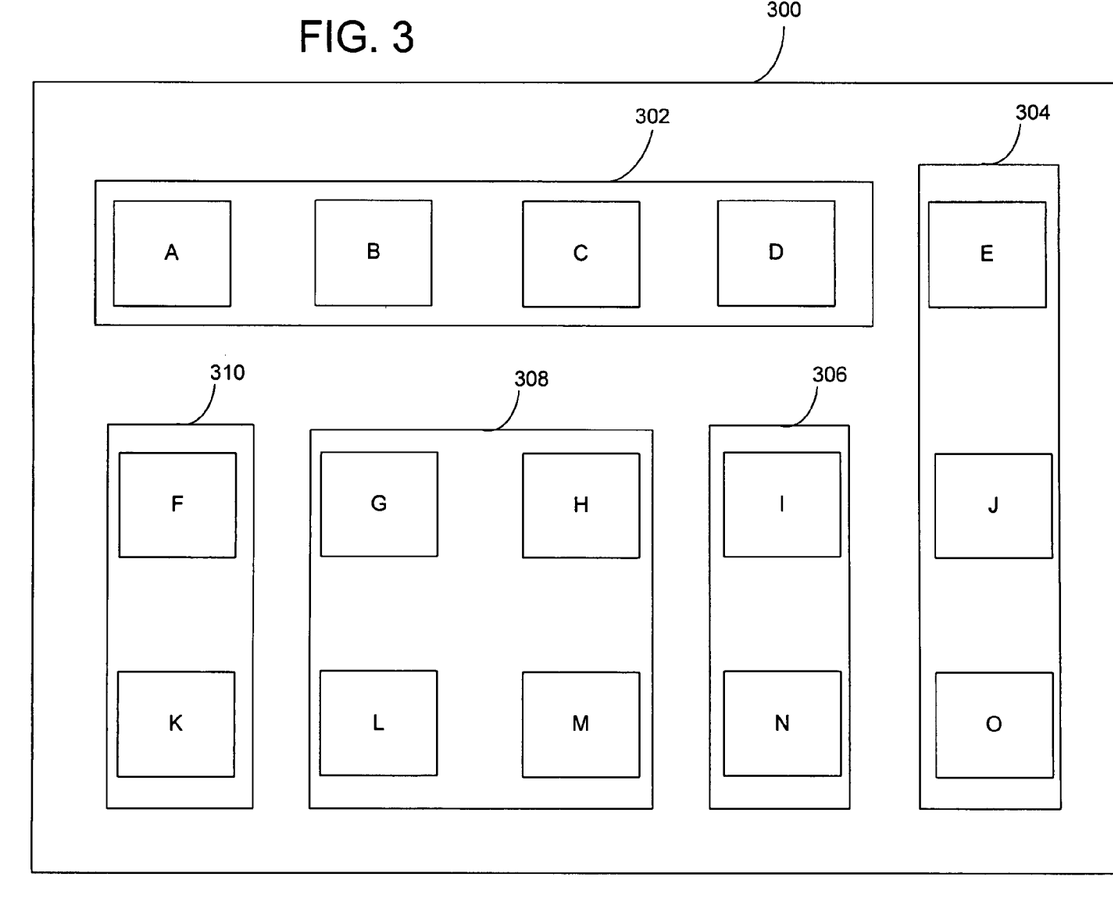
FIG. 3 is a block diagram of different roles assigned to update domains by an upgrade server, according to an embodiment of the invention.

FIG. 3 is a block diagram of different roles assigned to update domains by an upgrade server, according to an embodiment of the invention. The distributed application 300 is made up of numerous roles, which are illustrated as roles A through O. Numerous instances of each role may be stored by an upgrade server on a single or multiple servers, based on role's relationship to the distributed application as specified in a service model. An instance of a role refers to a copy of a role. Moreover, multiple instances of the distributed application 300 (meaning all of roles A though O) may be stored for access across different web servers. It should be noted that FIG. 3 merely illustrates the grouping of roles in a single distributed application into update domains.

Roles are assigned to different update domains, represented by solid-lined boxes 302 through 310. The designation of which roles to include in an update domain is determined by analyzing the service model that specifies the relationships of the roles in the distributed application 300. Moreover, roles for hosting the distributed application 300 may similarly be allocated to different host update domains in the same manner.

Figure 4:
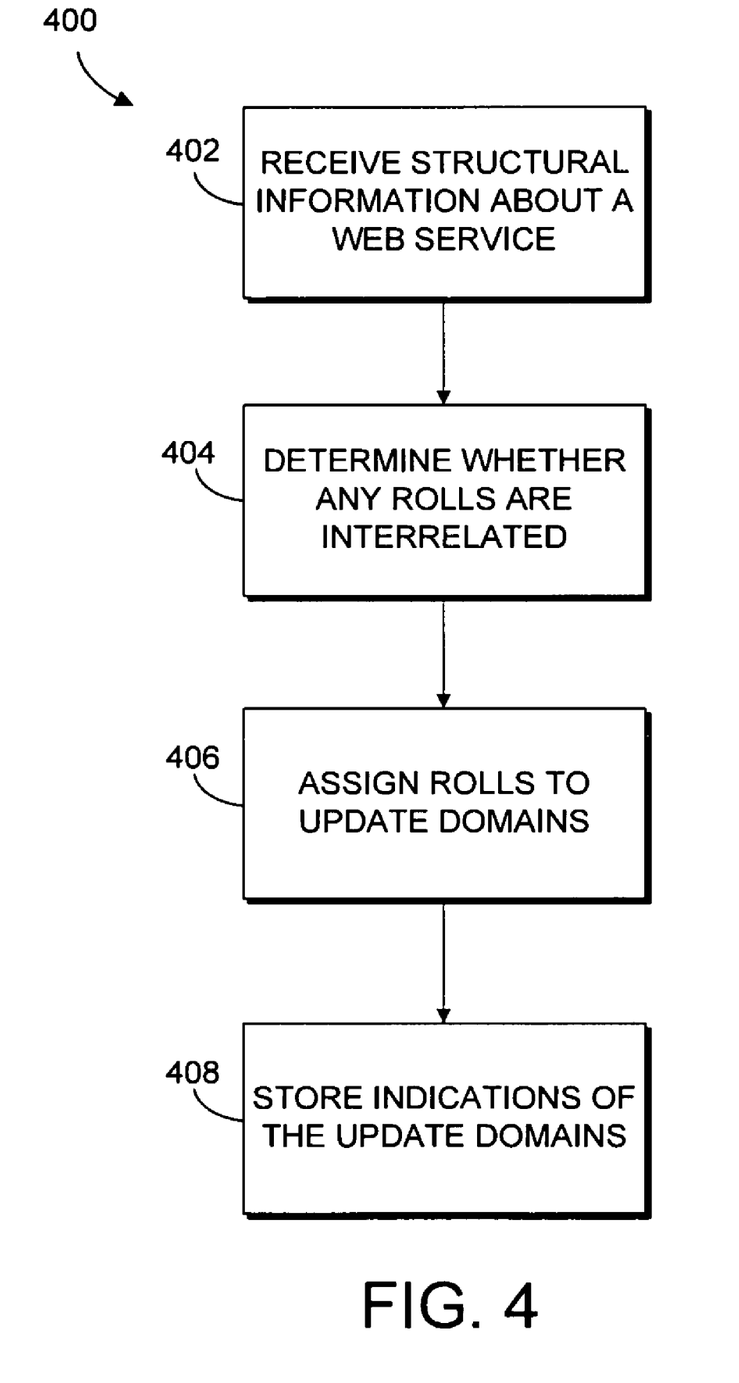
FIG. 4 is a diagram of a flow chart illustrating steps for roles of a distributed application to upgrade domains so the distributed application can be upgraded or revised in a piecemeal fashion, according to an embodiment of the invention.

FIG. 4 is a diagram of a flow chart illustrating steps for roles of a distributed application to upgrade domains so the distributed application can be upgraded or revised in a piecemeal fashion, according to an embodiment of the invention. As indicated at box 402, structural information about a distributed application is received. In one embodiment, the structural information is included within a service model either provided by a developer separately or entered by a user on a web site. The service model comprises the relationships of different roles associated with the distributed application. Or when roles are not defined by the service model, the code of a distributed application may be analyzed using various heuristics to determine how different roles are interrelated, as indicated at 404. Furthermore, structural information (i.e., roles and/or channels) for hosting the distributed application may also be provided to the server.

In one embodiment, the relationships of roles to one another are used by the server to assign the roles to different update domains, as indicated at 406. Indications of the roles assigned to update domains, along with the domains the roles are assigned to, are stored by the server, as indicated at 408.

Figure 5:
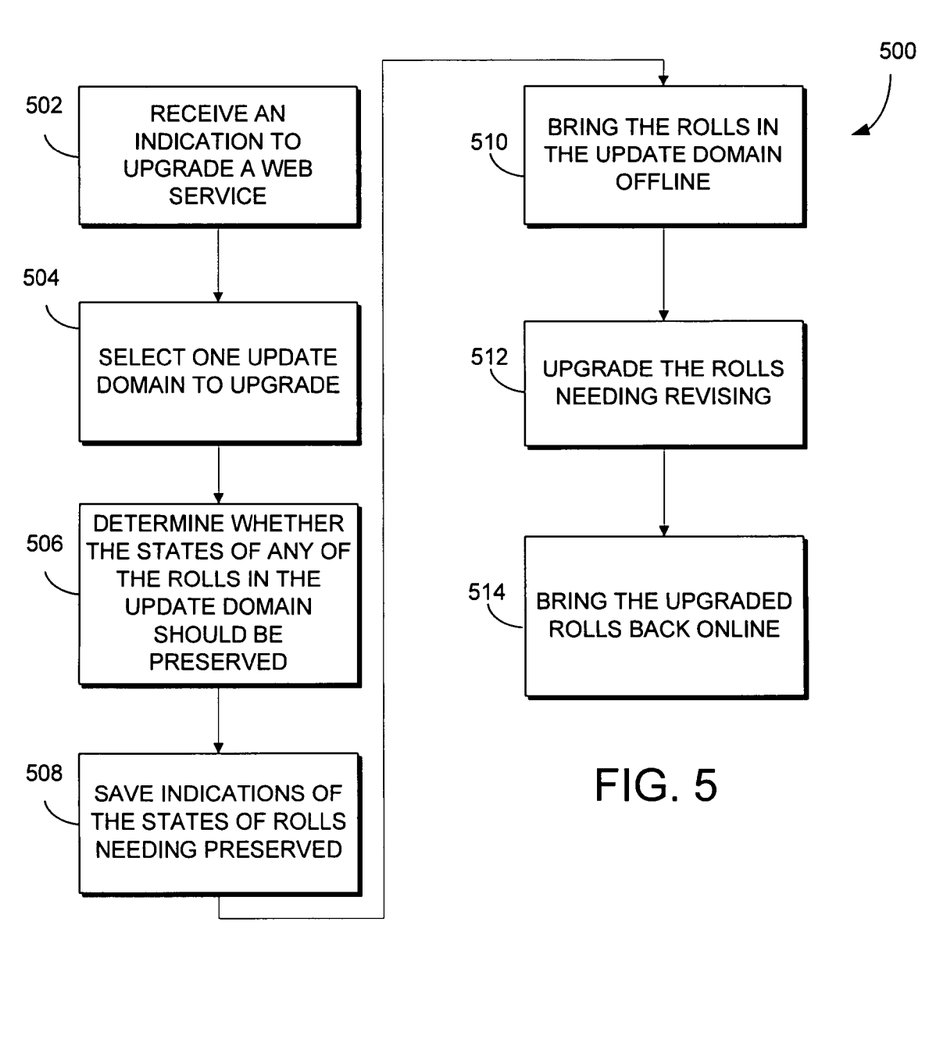
FIG. 5 is a diagram of a flow chart illustrating steps for upgrading portions of a distributed application in a piecemeal fashion, according to an embodiment of the invention.

FIG. 5 is a diagram of a flow chart illustrating steps for upgrading portions of a distributed application in a piecemeal fashion, according to an embodiment of the invention. Initially, an indication is sent to upgrade the web server, as indicated at 502. This indication may be routine maintenance that is periodically performed on the roles of the distributed application or an upgrade of the current roles. Upgrading the roles, as referred to herein, encompasses adding roles, deleting roles, or modifying roles of the distributed application. For example, roles may be modified to include a specific patch that eliminates a software failure. Or corrupted roles may be deleted or quarantined from other roles in the distributed application. Other examples and scenarios are also possible.

Once an upgrade is issued, an update domain is selected, as indicated at 504. The update domain may be strategically selected based on the relationships of the roles therein to other roles of the distributed application. In one embodiment, the roles of the selected update domain are checked to determine whether the states of any of the roles in the selected update domain should be preserved—i.e., whether the roles are "state-specific," as indicated at 506. The binary representation of a state-specific role includes a "sticky bit," which is a digital bit, or group of bits, that can be set to designate a state-specific role. Indications are stored of the current states of each state-specific role in the selected update domain, as indicated at 508. In an alternative embodiment, the current states of all roles in the selected update domain are stored if any one of the selected update domains is state-specific. One skilled in the art will understand how to store different states of roles.

Once the states of any state-specific roles are saved, the roles in the selected update domain are brought offline for upgrading, as indicated at 510. Bringing roles offline means making the roles inaccessible to remote requests from other roles in separate update domains. One skilled in the art will understand the numerous techniques that may be used to bring roles offline. Once offline, the roles are upgraded (indicated at 512) and brought back online (514). Bringing roles online refers to making the roles accessible to roles in other update domains.

In one embodiment, additional update domains are subsequently selected and upgraded according to steps 504-514 until all update domains have been upgraded. In this embodiment, only one update domain is upgraded at a time, and all update domains are eventually upgraded. Likewise, the steps in FIG. 5 may be applied to host update domains in the same manner.

Although the subject matter has been described in language specific to structural features and methodological acts, it is to be understood that the subject matter defined in the appended claims is not necessarily limited to the specific features or acts described above. Rather, the specific features and acts described above are disclosed as example forms of implementing the claims. For example, sampling rates and sampling periods other than those described herein may also be captured by the breadth of the claims.

The invention claimed is:

1. A method for upgrading multiple instances of a distributed application, the method comprising:
    receiving structural information about the distributed application, the structural information defining roles of the distributed application and comprising relationships between the roles within the distributed application, wherein the roles are portions of software associated with the distributed application;
    based on the structural information, determining whether any of the roles are interrelated;
    assigning a first quantity of the roles that are determined to be interrelated to a first update domain and a second quantity of roles that are determined to be interrelated to a second update domain, wherein the first quantity and the second quantity comprise separate roles of the distributed application, and further wherein an update domain comprises a group of portions of the software associated with the distributed application that can be taken down for upgrade at the same time without disturbing the availability of the other portions of the distributed application;
    storing indications that the first quantity of roles are assigned to the first update domain and the second quantity of roles are assigned to the second update domain;
    receiving an indication to upgrade a role;
    based on the structural information, strategically selecting one of the two or more update domains to take offline; and
    precluding access to the roles assigned to the one of the two or more update domains.

2. The method of claim 1, further comprising assigning hosting roles to two or more host update domains.

3. The method of claim 2, further comprising storing indications of at least one host update domain with at least one of the different copies of the hosting roles.

4. The method of claim 1, further comprising:
    determining that a role depends on a state; and
    assigning a bit associated with a copy of a role to indicate the state should be preserved.

5. The method of claim 1, further comprising:
    bringing the first quantity of roles offline;
    storing an upgraded version of at least one of the roles in the first quantity of roles; and
    bringing the first quantity of roles back online.

6. The method of claim 5, further comprising:
    bringing the second quantity of roles offline;
    storing a second upgraded version of at least one of the roles in the second quantity of roles; and
    bringing the second quantity of roles back online.

7. The method of claim 5, further comprising restoring the at least one role to the state after the at least one role has been brought back online.

8. The method of claim 1, further comprising:
    bringing the first quantity of roles offline;
    adding a new role to the first quantity of roles; and
    bringing the first quantity of roles back online.

9. The method of claim 1, further comprising:
    receiving hosting structural information specifying hosting roles that represent portions of software specific to hosting the distributed application; and
    assigning the hosting roles to one or more host update domains.

10. One or more computer-readable media having computer-executable instructions embodied thereon for upgrading multiple instances of a distributed application, the method comprising:
    defining roles of the distributed application, wherein the roles are portions of software associated with the distributed application;
    based on structural information about the distributed application, determining whether any of the roles are interrelated;
    assigning a first quantity of the roles to a first update domain and a second quantity of roles to a second update domain, wherein the first quantity and the second quantity comprise separate roles;
    storing indications that the first quantity of roles are assigned to the first update domain;
    determining at least one of the roles in the first quantity of roles is state-specific;
    receiving an indication to upgrade the first update domain;
    storing an indication of a state associated with the at least one of the roles;
    bringing the first quantity of roles offline;
    upgrading the first quantity of roles; and
    bringing the first quantity of roles online, wherein the at least one role is returned to the state.

11. The media of claim 10, further comprising:
    bringing the first quantity of roles offline;
    upgrading the first quantity of roles; and
    bringing the first quantity of roles online.

12. The media of claim 11, further comprising:
    after the first quantity of roles has been brought online, bringing the second quantity of roles offline;
    upgrading the second quantity of roles; and
    bringing the second quantity of roles online.

13. The media of claim 10, wherein the roles comprise executables associated with of the portions of the software associated with the distributed application.

14. The media of claim 13, wherein the executables are binary representations of the portions of the software associated with the distributed application.

15. One or more computer-readable media having computer-executable instructions embodied thereon for upgrading multiple instances of a distributed application, the method comprising:
- receiving an indication to upgrade a distributed application;
- selecting an update domain to upgrade, wherein the update domain comprises one or more roles associated with the distributed application, wherein the one or more roles are executable representations of portions of software associated with the distributed application;
- for each of the one or more roles, determining whether the role is state-specific based on a sticky bit assigned to the role;
- if the role is state-specific, saving an indication of the state currently assigned to the role;
- bringing the one or more roles offline;
- upgrading the one or more roles when offline; and
- bringing the one or more roles online, wherein the one or more roles are returned to the states assigned to the one or more roles when the one or more roles were brought offline based on the saved indication for state-specific roles.

16. The media of claim 15, further comprising:
- receiving additional roles associated with a hosting application;
- determining one or more host update domains to assign the additional roles to; and
- assigning the additional roles to the one or more host update domains.

17. The media of claim 16, further comprising:
- selecting a second update domain to upgrade, wherein the second update domain comprises a set of roles associated with the distributed application; and
- determining whether any of the roles in the set of roles is state-specific, and if so, saving a currently assigned state.

18. The media of claim 17, further comprising:
- bringing the set of roles associated with the distributed application offline;
- upgrading the set of roles when offline; and
- bringing the set of roles online and back to the currently assigned state.

\* \* \* \* \*